(12) United States Patent
Yae

(10) Patent No.: US 11,268,823 B2
(45) Date of Patent: Mar. 8, 2022

(54) SYSTEM AND METHOD FOR SUPPORTING AUTONOMOUS VEHICLE

(71) Applicants: HYUNDAI MOTOR COMPANY, Seoul (KR); KIA MOTORS CORPORATION, Seoul (KR)

(72) Inventor: Seong Soo Yae, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 203 days.

(21) Appl. No.: 16/599,463

(22) Filed: Oct. 11, 2019

(65) Prior Publication Data

US 2020/0355514 A1    Nov. 12, 2020

(30) Foreign Application Priority Data

May 10, 2019    (KR) .................. 10-2019-0055044

(51) Int. Cl.
*G01C 21/36* (2006.01)
*G05D 1/00* (2006.01)

(52) U.S. Cl.
CPC ..... *G01C 21/3626* (2013.01); *G01C 21/3605* (2013.01); *G01C 21/3697* (2013.01); *G05D 1/0088* (2013.01)

(58) Field of Classification Search
CPC ............ G01C 21/3636; G01C 21/3605; G01C 21/3697; G01C 21/3626; G05D 1/0088; G05D 2201/0213; G05D 1/0282; G05D 1/021; G05D 1/0274; B60W 30/14; B60W 50/14; B60W 2556/45; B60Y 2300/14

USPC .......................................... 701/533
See application file for complete search history.

(56) References Cited

U.S. PATENT DOCUMENTS

| | | | |
|---|---|---|---|
| 9,817,401 B2 | 11/2017 | Delp | |
| 9,847,401 B2 | 12/2017 | Chiu et al. | |
| 2018/0037223 A1* | 2/2018 | Goto | G05D 1/0231 |
| 2019/0204097 A1* | 7/2019 | Starns | G07C 5/0808 |
| 2019/0378363 A1* | 12/2019 | Becker | G07C 5/0841 |

FOREIGN PATENT DOCUMENTS

KR    10-1736977 B    5/2017

* cited by examiner

*Primary Examiner* — Paula L Schneider
(74) *Attorney, Agent, or Firm* — Morgan, Lewis & Bockius LLP

(57) ABSTRACT

A system and a method for supporting an autonomous vehicle are provided. The system may include a communicator configured to receive a driving route transmitted from a vehicle and a processor configured to extract a service section included in the driving route and to provide the vehicle with customized autonomous driving software for each service section of a plurality of service sections.

19 Claims, 4 Drawing Sheets

SYSTEM AND METHOD FOR SUPPORTING AUTONOMOUS VEHICLE

CROSS-REFERENCE TO RELATED APPLICATION

The present application claims priority to and the benefit of Korean Patent Application No. 10-2019-0055044, filed on May 10, 2019, which is incorporated herein by reference in its entirety.

TECHNICAL FIELD

The present disclosure relates to a system and a method for supporting an autonomous vehicle.

BACKGROUND

The statements in this section merely provide background information related to the present disclosure and may not constitute prior art.

As interest in autonomous vehicles increases, vehicle manufacturers and software manufacturers are focusing on developing integrated autonomous driving software that may cover regions and diverse road environments. It is difficult for such integrated autonomous driving software to reflect variation factors such as regional driving environment, driving propensity, topography, and the like. However, when these variation factors are not reflected, it will lead to accidents as a result. In addition, hardware is different for each developer, so that software developed for a specific vehicle may not be reused in another vehicle.

SUMMARY

An aspect of the present disclosure provides a system and a method for supporting an autonomous vehicle that provide autonomous driving software optimized for a section to be traveled by the autonomous vehicle.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, a system for supporting an autonomous vehicle includes a communicator that receives a driving route transmitted from a vehicle and a processor that extracts a service section included in the driving route and provides the vehicle with customized autonomous driving software for each service section.

The processor may search for at least one candidate autonomous driving software corresponding to each service section, select one of the at least one searched candidate autonomous driving software, and provide the selected candidate autonomous driving software as the customized autonomous driving software.

The processor may select optimal candidate autonomous driving software in consideration of at least one of a user feedback, the number of accidents, and usage fee.

According to an aspect of the present disclosure, a vehicle terminal includes a communicator that communicates with a server and a processor that sets a driving route and receives, from the server, customized autonomous driving software for a service section included in the driving route to perform autonomous driving.

The vehicle terminal may further include a positioning device that measures a current position of a vehicle. The processor may determine whether the vehicle enters the service section via the positioning device.

The processor may execute the customized autonomous driving software corresponding to the service section when the vehicle enters the service section.

The vehicle terminal may further include a memory storing embedded autonomous driving software. The processor may interrupt the execution of the customized autonomous driving software and execute the embedded autonomous driving software when the vehicle leaves the service section.

The processor may terminate the autonomous driving and transmit a feedback on the use of the customized autonomous driving software to the server when the vehicle arrives at a destination.

The feedback may include at least one of a user satisfaction, whether an accident occurred, and the number of the occurrences of the accidents.

The processor may execute the embedded autonomous driving software when the vehicle has not entered the service section.

In another form of the present disclosure, a method for supporting an autonomous vehicle includes setting a driving route and determining whether to use customized autonomous driving software, by a vehicle terminal, receiving from a server, by the vehicle terminal, customized autonomous driving software for a service section included in the driving route when it is determined that the customized autonomous driving software is to be used, and performing, by the vehicle terminal, autonomous driving using the customized autonomous driving software.

The performing of the autonomous driving may include determining, by the vehicle terminal, whether the vehicle enters the service section and performing the autonomous driving, by the vehicle terminal, at the service section using the customized autonomous driving software when it is identified that the vehicle enters the service section.

The method may further include performing the autonomous driving, by the vehicle terminal, using embedded autonomous driving software when the vehicle has not entered the service section.

The method may further include, after the performing of the autonomous driving, determining, by the vehicle terminal, whether the vehicle arrives at a destination and transmitting, by the vehicle terminal, a feedback on the use of the customized autonomous driving software when it is identified that the vehicle has arrived at the destination.

The feedback may include at least one of a user satisfaction, whether an accident occurred, and the number of the occurrences of the accidents.

The method may further include, after the determining of whether to use the customized autonomous driving software, performing, by the vehicle terminal, the autonomous driving using embedded autonomous driving software when it is determined that the customized autonomous driving software is not to be used.

In another form of the present disclosure, a method for supporting an autonomous vehicle includes receiving, by a server, a driving route from a vehicle terminal, extracting, by the server, a service section from the driving route, searching, by the server, for candidate autonomous driving software for the extracted service section, generating a list of the searched candidate autonomous driving software and transmitting the list to the vehicle terminal, by the server, and transmitting, by the server, to the vehicle terminal, one of the candidate autonomous driving software selected by the vehicle terminal from the list.

The server may select one of the searched candidate autonomous driving software as optimal autonomous driving software and transmit the selected candidate autonomous driving software to the vehicle terminal after the searching of the candidate autonomous driving software.

The server may select the optimal candidate autonomous driving software in consideration of at least one of a user feedback, the number of accidents, and usage fee.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
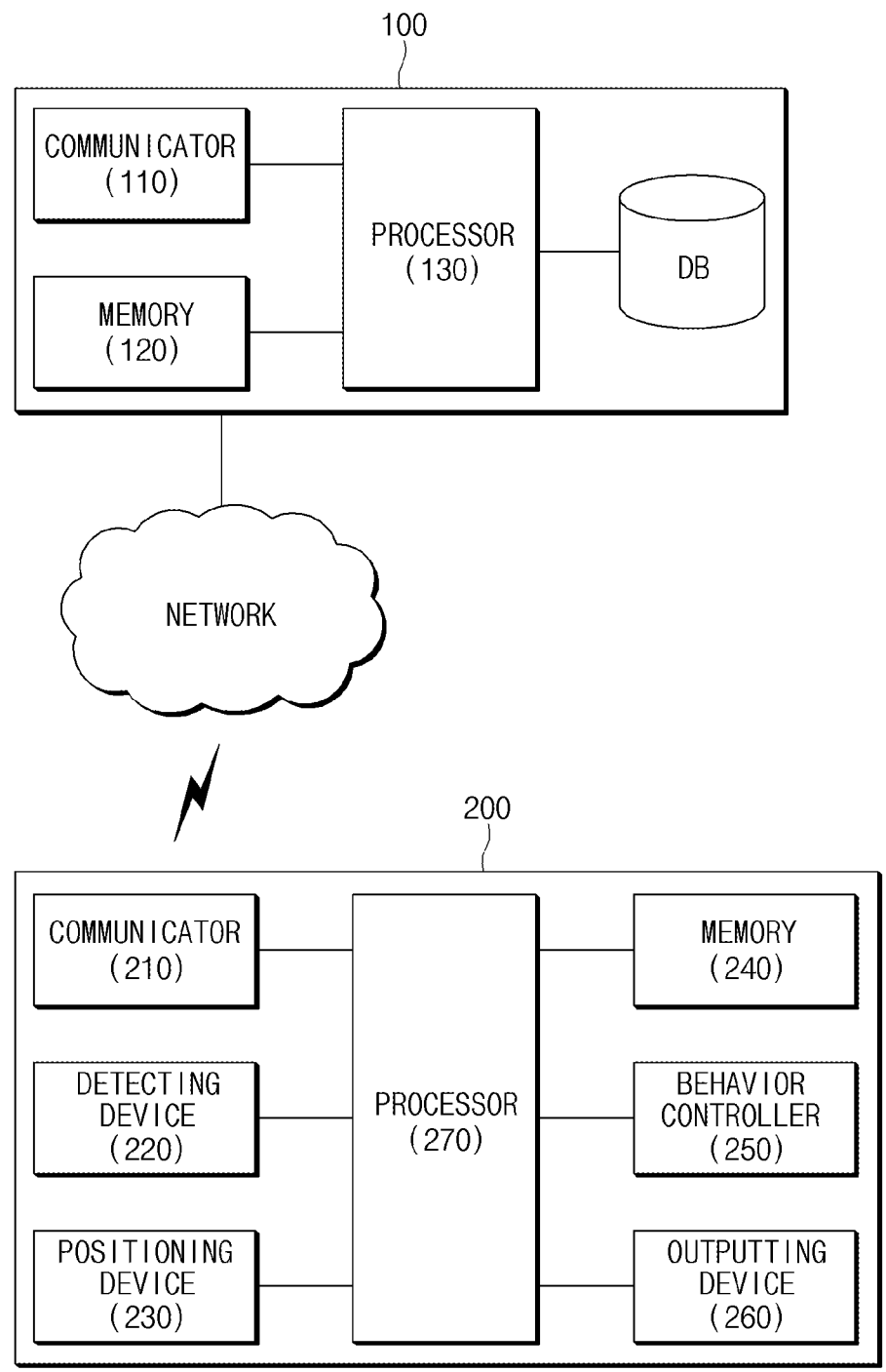
FIG. 1 is a block diagram illustrating a system that supports an autonomous vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
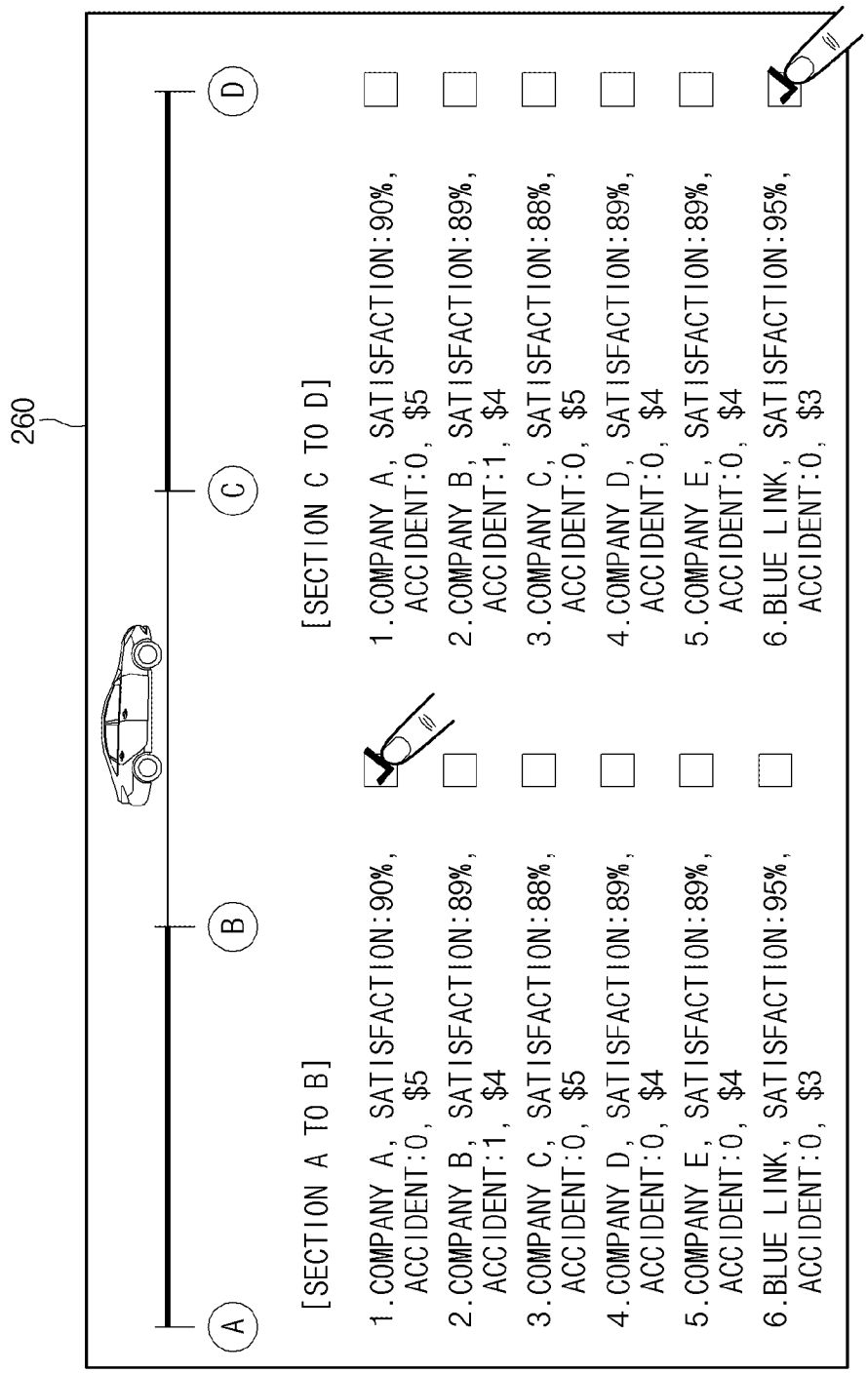
FIG. 2 illustrates an example of selecting customized autonomous driving software in one form of the present disclosure.

FIG. 1 is a block diagram illustrating a system that supports an autonomous vehicle in some forms of the present disclosure. Further, FIG. 2 illustrates an example of selecting customized autonomous driving software in some forms of the present disclosure.

Referring to FIG. 1, the autonomous driving support system includes a server 100 and a vehicle terminal 200 connected with each other via a network. The network may be implemented with a wireless Internet technology, a short-range communication technology, and/or a mobile communication technology. In this connection, as the wireless Internet technology, a wireless LAN (WLAN) (WiFi), a Wireless broadband (Wibro), and/or a World Interoperability for Microwave Access (Wimax), and the like may be used. As the short-range communication technology, a Bluetooth, a Near Field Communication (NFC), a Radio Frequency Identification (RFID), an Infrared Data Association (IrDA), a Ultra Wideband (UWB), and/or a ZigBee, and the like may be used. As the mobile communication technology, a Code Division Multiple Access (CDMA), a Global System for Mobile communication (GSM), a Long Term Evolution (LTE), a LTE-Advanced, and/or an International Mobile Telecommunication (IMT)-2020, and the like may be used.

The server 100 provides optimal autonomous driving software for each service section. Further, the server 100 may include a communicator 110, a memory 120, a database (DB), and a processor 130.

The communicator 110 performs a wired communication and/or a wireless communication. In this connection, the wired communication technology may be implemented as a LAN (Local Area Network), a WAN (Wide Area Network), an Ethernet (Ethernet) and/or an ISDN (Integrated Services Digital Network), or the like. The communicator 110 allows the server 100 to exchange data with the vehicle terminal 200.

The memory 120 may store software programmed to allow the processor 130 to perform a predetermined operation. The memory 120 may be implemented as at least one of storage media (recording media) such as a flash memory, a hard disk, an SD card (Secure Digital Card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, or the like.

The database (DB) stores and manages information about a user subscribed to a service (i.e., subscriber information). The user information may include user identification information, history of use of the autonomous driving software, contract conclusion information, owned vehicle information, and the like. The database (DB) stores and manages autonomous driving software for each service section and for each solution company. Each of the solution companies may develop optimal autonomous driving software for a corresponding service section in consideration of information of traffic volume for each time for each service section, a congestion section, weather (e.g., rain and/or freezing, or the like), a driving behavior such as lane offense or the like, a traveling vehicle type for each time, a signal system, a road type (such as asphalt, Belgian, or the like), and/or complexity by section (e.g., a department store and/or an interchange, or the like), or the like and register the autonomous driving software in the database (DB).

The processor 130 controls an overall operation of the server 100. The processor 130 may be implemented as at least one of an application specific integrated circuit (ASIC), a digital signal processor (DSP), a programmable logic device (PLD), field programmable gate arrays (FPGAs), a central processing unit (CPU), microcontrollers, or microprocessors.

The processor 130 may receive a driving route and customized autonomous driving software provision request transmitted from the vehicle terminal 200 via the communicator 110. When the request of providing the customized autonomous driving software is received, the processor 130 extracts (detects) the service section from the driving route.

In this connection, the service section refers to a section at which optimal autonomous driving software in consideration of driving characteristics and driving environment is provided.

In other words, the processor 130 determines whether there is the service section on the driving route. When at least one service section is detected on the driving route, the processor 130 searches for candidate autonomous driving software corresponding to each service section detected from the database (hereinafter DB). For example, when the service section is detected on the driving route, the processor 130 searches, in the DB, for autonomous driving software for each of the solution companies, which is optimized for the detected service section.

The processor 130 transmits the search results to the vehicle terminal 200 requested to provide the customized autonomous driving software via the communicator 110. Thereafter, the processor 130 receives a request of downloading one of the search results from the vehicle terminal 200. The processor 130 proceeds to perform, with the vehicle terminal 200, concluding a contract and making usage fee payment associated with use of selected autonomous driving software based on a predetermined contract procedure. When the contract conclusion and the usage fee payment with the vehicle terminal 200 is completed, the processor 130 reads the requested autonomous driving software from the DB and transmits the requested autonomous driving software to the vehicle terminal 200.

Thereafter, the processor 130 receives a feedback based on use of the autonomous driving software, transmitted from the vehicle terminal 200. The feedback may include information such as user satisfaction, the number of accidents, and usage fees. The processor 130 stores and manages the feedback of each autonomous driving software in the DB.

Further, the processor 130 may select the customized autonomous driving software for each detected service section based on the search results and provide the selected autonomous driving software to the vehicle terminal 200. The processor 130 may select the optimal autonomous driving software for each service section and provide the selected optimal autonomous driving software as the customized autonomous driving software of the corresponding service section. The processor 130 selects the optimal autonomous driving software for each service section in consideration of user satisfaction, the number of accidents, and the usage fee, or the like resulting from the autonomous driving software usage. In this connection, the processor 130 assigns weights on the user satisfaction, the number of accidents, the usage fee, and the like and calculates a fitness for the autonomous driving software of each solution company for each service section. Further, the processor 130 selects autonomous driving software having the highest calculated fitness as the optimal autonomous driving software for each service section. The processor 130 may provide the selected optimal autonomous driving software to the vehicle terminal 200 as the customized autonomous driving software.

The vehicle terminal 200 is mounted on a vehicle capable of autonomous driving (i.e., an autonomous vehicle) to perform the autonomous driving. The vehicle terminal 200 accesses the server 100 to use the customized autonomous driving software and performs service subscription based on a predetermined service subscription procedure. A user may proceed to subscribe a service using a mobile terminal (e.g., a smart phone, a laptop computer, or the like) a desktop computer, or the like as well as the vehicle terminal 200.

The vehicle terminal 200 includes a communicator 210, a detecting device 220, a positioning device 230, a memory 240, a behavior controller 250, an outputting device 260, and a processor 270.

The communicator 210 allows the vehicle terminal 200, that is, the vehicle, to communicate with the server 100. The communicator 210 may use at least one of communication technologies such as a vehicle communication technology (e.g., a V2V and/or IVN, or the like), a wireless communication technology (e.g., a Wi-Fi, a Bluetooth, and/or a NEC, or the like), or a wired communication technology, for example, a Universal Serial Bus (USE) or the like.

The detecting device 220 detects surrounding information of the vehicle and vehicle information via sensors mounted on the vehicle. The sensors may include a Radio Detection and Ranging (RADAR), a Light Detection And Ranging (LiDAR), an ultrasonic sensor, an image sensor, a velocity sensor, an acceleration sensor, a steering angle sensor, an impact sensor, and the like. The detecting device 220 may obtain the vehicle information from an electronic control unit (ECU) such as an air bag system, a vehicle door system, an electronic stability control (ESC), a traction control system (TCS), and/or an antilock brake system (ABS), and the like.

The positioning device 230 measures a current position of the vehicle. The positioning device 230 may measure the vehicle position using at least one of positioning technologies such as a Global Positioning System (GPS), a Dead Reckoning (DR), a Differential GPS (DGPS), a Carrier Phase Differential GPS (CDGPS), or the like.

The memory 240 may store software programmed to allow the processor 270 to perform a predetermined operation. The memory 240 may be implemented as at least one of storage media (recording media) such as a flash memory, a hard disk, an SD card (Secure Digital Card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The memory 240 may store map data and information received via the communicator 210. The memory 240 may store a route generation algorithm, an image processing algorithm, a big data analysis algorithm, and the like. Further, the memory 240 may store navigation software, embedded autonomous driving software, i.e., its own autonomous driving software.

The behavior controller 250 controls a power source controller (e.g., an engine controller), a braking controller, a steering controller, and/or a shift controller to control acceleration/deceleration, braking, shifting, and/or steering of the vehicle. The power source controller controls a power source (e.g., an engine and/or a drive motor, or the like) of the vehicle. The power source controller controls a drive torque of the power source based on accelerator pedal position information or a driving speed requested from an upper controller. The braking controller controls a braking pressure based on a position of the brake pedal or based on an instruction from the upper controller. The steering controller controls the steering of the vehicle and may be implemented as a motor drive power steering (MDPS). The shift controller is an actuator for controlling a transmission (shift) of the vehicle and may be implemented as a shift by wire (SBW). The shift controller controls the shifting of the vehicle based on a gear position and gear state range.

The outputting device 260 outputs progress and results based on an operation of the processor 270 in a form of visual, auditory, and/or tactile information. The outputting device 260 may include a display device, an audio output device, a tactile signal output device, or the like. The display device may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, and a cluster. When the display device is implemented as the touch screen, the display device may be used as an input device as well as the output device. The audio output device may output audio data stored in the memory 240. The audio output device may include a receiver, a speaker, and/or a buzzer, and the like. The tactile signal output device outputs a signal in a form that the user may perceive with a tactile sense. For example, the tactile signal output device may be implemented as a vibrator to control vibration intensity, pattern, or the like.

The processor 270 controls an overall operation of the vehicle terminal 200. The processor 270 may be implemented as at least one of an application specific integrated circuit (ASIC), a digital signal processor (DSP), a programmable logic device (PLD), field programmable gate arrays (FPGAs), a central processing unit (CPU), microcontrollers, and microprocessors.

The processor 270 may set a destination in accordance with the user input. The processor 270 may set a driving route to arrive at the set destination from a departure point (e.g., the current position of the vehicle). In this connection, the processor 270 may generate the driving route using the map data stored in the memory 240 or may receive a driving route reflecting traffic information from a navigation service server.

The processor 270 determines whether to use the customized autonomous driving software when the setting of the driving route is completed. The processor 270 may inquire of the user whether to use the customized autonomous driving software via the outputting device 260 and may determine whether to use the customized autonomous driving software based on a user response. Alternatively, the processor 270 may identify user setting information stored in the memory 240 to determine whether to use the customized autonomous driving software.

The processor 270 transmits a request to the server 100 to provide the customized autonomous driving software when the use of the customized autonomous driving software is determined. The processor 270 transmits the driving route together when requesting of the customized autonomous driving software provision.

Thereafter, the processor 270 receives a list of candidate autonomous driving software for each service section included in the driving route from the server 100. The processor 270 may display received information on the outputting device 260 as shown in FIG. 2. For example, referring to FIG. 2, the processor 270 lists and displays the autonomous driving software of each solution company for each of a section A-B and a section C-D of the driving route. In this connection, the processor 270 displays user feedback information about the autonomous driving software provided by each solution company. When autonomous driving software to be used by the user is selected, the processor 270 transmits the corresponding selection result to the server 100. That is, the processor 270 requests the server 100 for downloading the selected autonomous driving software.

The processor 270 proceeds to perform, with the server 100, concluding a contract and making usage fee payment associated with the use of the customized autonomous driving software corresponding to each service section. The processor 270 concludes the contract (e.g., period of use or the like) based on a predetermined contract procedure and makes the software usage fee payment based on the concluded contract. The processor 270 may process the payment for the usage fee using one of various known usage fee payment techniques.

When the contract conclusion and the usage fee payment are completed, the processor 270 downloads the customized autonomous driving software corresponding to each service section from the server 100. The processor 270 may store the downloaded customized autonomous driving software in the memory 240.

Subsequently, the processor 270 starts driving along the set driving route. The processor 270 identifies the current position of the vehicle while driving to determine whether the vehicle enters the service section. The processor 270 executes customized autonomous driving software corresponding to the corresponding service section when the vehicle enters the service section. The processor 270 controls the behavior controller 250 based on output from the customized autonomous driving software to perform the autonomous driving.

The processor 270 determines whether the vehicle leaves the service section or arrives at the destination while driving at the service section. The processor 270 interrupts the execution of the customized autonomous driving software when the vehicle leaves the service section or arrives at the destination. When the vehicle has left the service section but has not arrived at the destination, the processor 270 executes its own autonomous driving software stored in memory 240, i.e., the embedded autonomous driving software. The processor 270 controls the behavior controller 250 based on the output, resulting from the execution of its own autonomous driving software, to perform the autonomous driving.

On the other hand, when it is determined not to use the customized autonomous driving software or when the vehicle has not entered the service section, the processor 270 executes its own autonomous driving software stored in the memory 240. The processor 270 transmits a control command to the behavior controller 250 based on output resulting from the execution of the autonomous driving software. The behavior controller 250 controls a behavior of the vehicle based on the control command transmitted from the processor 270 to perform the autonomous driving.

When the vehicle arrives at the destination, the processor 270 may transmit, to the server 100, a feedback on the use of the customized autonomous driving software. The processor 270 transmits feedback information including information on user satisfaction with the used autonomous driving software, whether an accident occurred (accident occurrence) or the number of the occurrences of the accidents during the autonomous driving using the autonomous driving software, or the like.

Figure 3A:
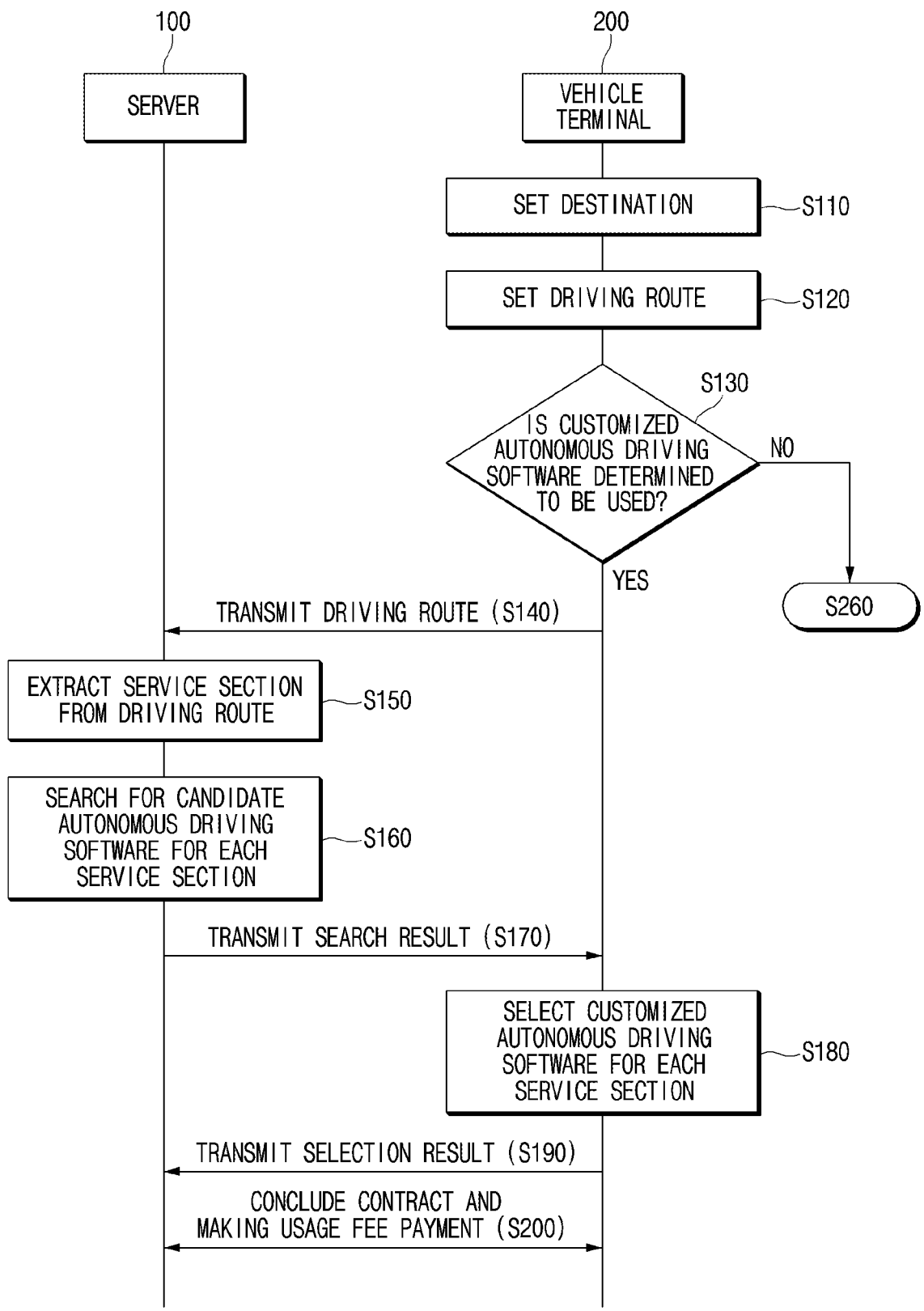
FIG. 3A is a flowchart illustrating a method for supporting an autonomous vehicle in one form of the present disclosure.
Figure 3B:
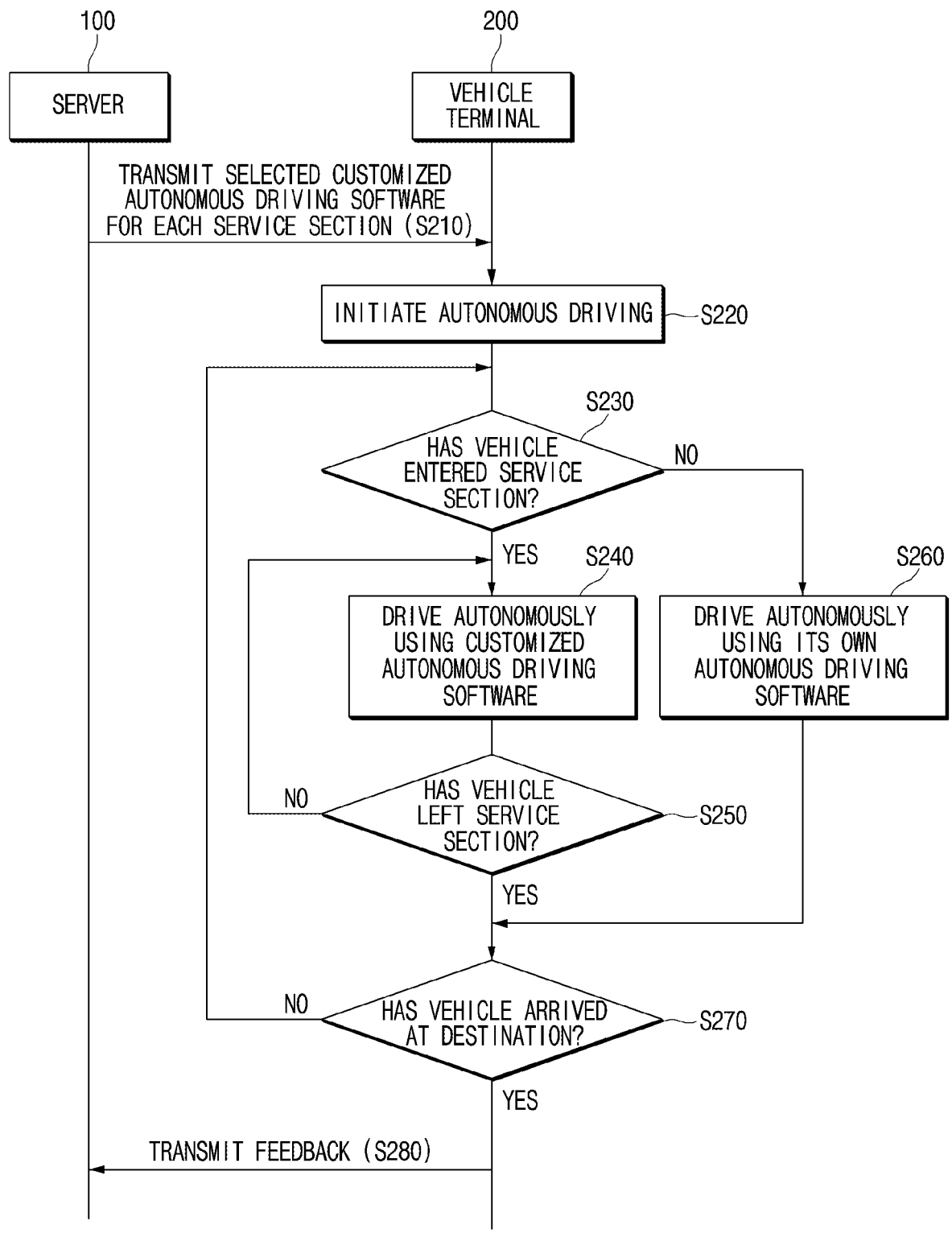
FIG. 3B is a flowchart illustrating a method for supporting an autonomous vehicle in one form of the present disclosure.

FIGS. 3A and 3B are flowcharts illustrating a method for supporting an autonomous vehicle in some forms of the present disclosure.

When the destination is set by the user (S110), the vehicle terminal 200 sets the driving route based on the destination (S120). For example, the vehicle terminal 200 may set the driving route from the current position of the vehicle to the destination using the map data stored in the memory 240. Alternatively, the vehicle terminal 200 may be provided with a driving route reflecting real-time traffic information from the server providing the navigation service.

When the driving route is set, the vehicle terminal 200 determines whether the customized autonomous driving software is to be used (S130). The vehicle terminal 200 determines the use of the customized autonomous driving software based on the setting information resulted from the user input.

When the use of the customized autonomous driving software is identified, the vehicle terminal 200 transmits the set driving route to the server 100 (S140). At this time, the vehicle terminal 200 transmits the request of providing the customized autonomous driving software together with the driving route.

When the driving route is received from the vehicle terminal 200, the server 100 extracts the service section from the driving route (S150). In other words, the server 100 determines whether there is the service section on the driving route set by the vehicle terminal 200 based on the request of providing the customized autonomous driving software from the vehicle terminal 200.

The server 100 searches for the candidate autonomous driving software for each service section (S160). When at least one service section is extracted from the driving route, the server 100 searches, in the DB, for the candidate autonomous driving software corresponding to each extracted service section, i.e., the autonomous driving software for each solution company.

The server 100 transmits the search results to the vehicle terminal 200 (S170). The server 100 generates the list of the candidate autonomous driving software corresponding to each service section included in the driving route and transmits the list to the vehicle terminal 200. The list of the candidate autonomous driving software includes the user satisfaction, the number of accidents, and the usage fees for each autonomous driving software.

The vehicle terminal 200 selects the customized autonomous driving software for each service section based on the search result (S180). When the search result is received from the server 100, the vehicle terminal 200 outputs the corresponding search result to the outputting device 260. The vehicle terminal 200 selects, based on the user input, the customized autonomous driving software for each service section from the search result. For example, as shown in FIG. 2, when the user selects, based on the search results, autonomous driving software of company A as customized autonomous driving software to be used for the section A-B and a blue link as customized autonomous driving software to be used for the section C-D, the vehicle terminal 200 generates, based on the user input, a result of selection of customized autonomous driving software for each service section.

The vehicle terminal 200 transmits the selection result of the customized autonomous driving software by the user to the server 100 (S190).

When the customized autonomous driving software selection result is received, the server 100 proceeds to perform, with the vehicle terminal 200, concluding the mutually agreed contract and making the usage fee payment associated with the use of the selected autonomous driving software (S200). The server 100 and the vehicle terminal 200 conclude the contract related to the use of the customized autonomous driving software based on the predetermined contract procedure and process the usage fee payment.

When the contract conclusion and the usage fee payment are completed, the server 100 transmits the selected customized autonomous driving software to the vehicle terminal 200 (S210). The server 100 reads the customized autonomous driving software corresponding to each service section from the DB and transmits the read customized autonomous driving software to the vehicle terminal 200.

When the customized autonomous driving software is received, the vehicle terminal 200 initiates the autonomous driving along the set driving route (S220).

The vehicle terminal 200 determines whether the vehicle enters the service section during the autonomous driving (S230). The vehicle terminal 200 determines whether the current position of the vehicle measured by the positioning device 230 is within a predetermined radius of an entry point of the service section.

When it is determined that the vehicle has entered the service section, the vehicle terminal 200 uses the customized autonomous driving software corresponding to the corresponding service section to control the autonomous driving (S240). That is, the vehicle terminal 200 executes the customized autonomous driving software corresponding to the service section where the vehicle has entered and controls the behavior controller 250 based on the output resulted from the execution to perform the autonomous driving.

The vehicle terminal 200 determines whether the vehicle leaves the service section while autonomous driving at the service section (S250). Although not shown in the drawing, the vehicle terminal 200 may also determine whether the vehicle has arrived at the destination. The vehicle terminal 200 terminates the autonomous driving when the vehicle arrives at the destination during the autonomous driving at the service section.

In S230, when the vehicle has not entered the service section, the vehicle terminal 200 performs the autonomous driving using its own autonomous driving software (S260). When the vehicle has not entered the service section, the vehicle terminal 200 executes the embedded autonomous driving software stored in the memory 240 to implement the autonomous driving. The processor 270 of the vehicle terminal 200 instructs the behavior controller 250 to control the behavior of the vehicle based on the output resulting from the execution of the embedded autonomous driving software.

The vehicle terminal 200 determines whether the vehicle has arrived at the destination after S250 and S260 (S270).

When it is identified in S270 that the vehicle has not arrived at the destination, the vehicle terminal 200 returns to S220 to determine whether the vehicle has entered the service section and processes a subsequent procedure based on the identification result.

When it is identified in S270 that the vehicle has arrived at the destination, the vehicle terminal 200 transmits the feedback on the customized autonomous driving software for each service section to the server 100 (S280). That is, the vehicle terminal 200 transmits, to the server 100, the user feedback information including information on the user satisfaction, whether the accident has occurred, the number of the accidents, and the like for the customized autonomous driving software corresponding to each service section. The server 100 stores and manages the user feedback information received from the vehicle terminal 200 in the DB.

When it is identified that the customized autonomous driving software is not to be used in S130, the vehicle terminal 200 performs the autonomous driving using its own autonomous driving software stored in the memory 240 (S260). When it is identified that the customized autonomous driving software is not to be used, the vehicle terminal 200 executes its own autonomous driving software and performs the autonomous driving using its own autonomous driving software until the vehicle arrives at the destination.

According to the present disclosure, the autonomous driving software optimized for the section to be traveled by the autonomous vehicle is provided. Therefore, the autonomous driving may be performed more safely.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for supporting an autonomous vehicle, the system comprising:
a communication device configured to receive a driving route transmitted from a vehicle terminal; and
a processor configured to:
extract at least one service section from the driving route; and
provide the vehicle terminal with customized autonomous driving software for each of the at least one service section via the communication device for the vehicle terminal to perform an autonomous driving using the customized autonomous driving software,
wherein each of the at least one service section is a section at which optimal autonomous driving software in consideration of driving characteristics and driving environment is provided.

2. The system of claim 1, wherein the processor is configured to:
search for at least one candidate autonomous driving software corresponding to each service section of the plurality of service sections in a database;
select at least one searched candidate autonomous driving software; and
transmit the selected candidate autonomous driving software as the customized autonomous driving software to the vehicle terminal.

3. The system of claim 2, wherein the processor is configured to:
select the optimal candidate autonomous driving software based on at least one of a user feedback, a number of accidents, or a usage fee received from the vehicle terminal.

4. A vehicle terminal comprising:
a communication device configured to communicate with a server; and
a processor configured to:
set a driving route to a destination set by a user using a map data stored in a memory; and
receive, from the server via the communication device, customized autonomous driving software for a service section included in the driving route and perform an autonomous driving using the customized autonomous driving software,
wherein the service section is a section at which optimal autonomous driving software in consideration of driving characteristics and driving environment is provided.

5. The vehicle terminal of claim 4, wherein the vehicle terminal further comprises:
a positioning device configured to measure a current position of a vehicle, wherein the processor is configured to determine whether the vehicle enters the service section based on the current position of the vehicle measured by the positioning device.

6. The vehicle terminal of claim 5, wherein the processor is configured to:
execute the customized autonomous driving software corresponding to the service section when the vehicle enters the service section.

7. The vehicle terminal of claim 6, wherein the vehicle terminal further comprises:
a memory configured to store embedded autonomous driving software,
wherein the processor is configured to:
interrupt an execution of the customized autonomous driving software; and
execute the embedded autonomous driving software when the vehicle leaves the service section.

8. The vehicle terminal of claim 7, wherein the processor is configured to:
terminate the autonomous driving; and
transmit a feedback on a use of the customized autonomous driving software to the server when the vehicle arrives at a destination.

9. The vehicle terminal of claim 8, wherein the feedback comprises at least one of a user satisfaction, an accident occurrence, or a number of accidents.

10. The vehicle terminal of claim 7, wherein the processor is configured to:
execute the embedded autonomous driving software when the vehicle does not enter the service section.

11. A method for supporting an autonomous vehicle, the method comprising:
setting, by a vehicle terminal, a driving route to a destination set by a user using a map data stored in a memory;
determining, by the vehicle terminal, whether to use customized autonomous driving software;
when it is determined that the customized autonomous driving software is used, receiving, by the vehicle terminal, customized autonomous driving software for a service section included in the driving route from a server; and
performing, by the vehicle terminal, an autonomous driving using the customized autonomous driving software,
wherein the service section is a section at which optimal autonomous driving software in consideration of driving characteristics and driving environment is provided.

12. The method of claim 11, wherein performing the autonomous driving comprises:
determining, by the vehicle terminal, whether the vehicle enters the service section; and when the vehicle enters the service section, performing, by the vehicle terminal, the autonomous driving at the service section using the customized autonomous driving software.

13. The method of claim 12, wherein the method further comprises:
when the vehicle does not enter the service section, performing, by the vehicle terminal, the autonomous driving using embedded autonomous driving software.

14. The method of claim 11, wherein the method further comprises:
determining, by the vehicle terminal, whether the vehicle arrives at a destination; and
when it is determined that the vehicle arrives at the destination, transmitting, by the vehicle terminal, a feedback on a use of the customized autonomous driving software.

15. The method of claim 14, wherein the feedback comprises at least one of a user satisfaction, an accident occurrence, or a number of accidents.

16. The method of claim 11, wherein the method further comprises:
when it is determined that the customized autonomous driving software is not used, performing, by the vehicle terminal, the autonomous driving using embedded autonomous driving software.

17. A method for supporting an autonomous vehicle, the method comprising:
receiving, by a server, a driving route from a vehicle terminal;
extracting, by the server, a service section from the driving route;
searching, by the server, for candidate autonomous driving software for the extracted service section in a database;
generating, by the server, a list of the searched candidate autonomous driving software;
transmitting, by the server, the list to the vehicle terminal;
transmitting, by the server, one of the candidate autonomous driving software selected by the vehicle terminal from the list to the vehicle terminal: and
performing, by the vehicle terminal, an autonomous driving using the transmitted one of the candidate autonomous driving software.
wherein the service section is a section at which optimal autonomous driving software in consideration of driving characteristics and driving environment is provided.

18. The method of claim 17, wherein the method comprises:
selecting, by the server, one of the searched candidate autonomous driving software as the optimal autonomous driving software; and
transmitting, by the server, the selected candidate autonomous driving software to the vehicle terminal.

19. The method of claim 18, wherein the method comprises:
selecting, by the server, the optimal candidate autonomous driving software based on at least one of a user feedback, a number of accidents, and a usage fee received from the vehicle terminal.

* * * * *